United States Patent [19]

Bertus et al.

[11] 4,198,317

[45] Apr. 15, 1980

[54] PASSIVATION OF METALS WHICH CONTAMINATE CRACKING CATALYSTS WITH ANTIMONY TRIS (HYDROCARBYL SULFONATE)

[75] Inventors: Brent J. Bertus; Dwight L. McKay; Harold W. Mark, all of Bartlesville, Okla.

[73] Assignee: Phillips Petroleum Company, Bartlesville, Okla.

[21] Appl. No.: 926,698

[22] Filed: Jul. 25, 1978

[51] Int. Cl.$^2$ .................. C10G 9/16; C10G 11/06; C07F 9/90; B01J 23/18
[52] U.S. Cl. .................. 252/411 R; 208/48 AA; 208/52 CT; 208/119; 252/430; 252/439; 252/456; 260/446
[58] Field of Search .............. 260/446, 448.2 R; 252/411 R, 426, 428, 430, 439, 456, 464; 423/87, 617

[56] References Cited

U.S. PATENT DOCUMENTS

| | | | |
|---|---|---|---|
| 2,129,693 | 9/1938 | Houdry | 208/119 |
| 3,506,567 | 4/1970 | Barger et al. | 208/89 |
| 3,711,422 | 1/1973 | Johnson et al. | 252/414 |
| 3,979,472 | 9/1976 | Butter | 260/668 R |
| 4,007,231 | 2/1977 | Butter | 260/672 T |
| 4,025,458 | 5/1977 | McKay | 252/416 |
| 4,036,740 | 7/1977 | Readal et al. | 208/120 |
| 4,080,396 | 3/1978 | Butter | 260/673 |
| 4,111,845 | 9/1978 | McKay | 208/120 |

*Primary Examiner*—Delbert E. Gantz
*Assistant Examiner*—G. E. Schmitkons

[57] ABSTRACT

A hydrocarbon cracking catalyst the effectiveness of which is impaired by deposition thereon of a metal contaminant, e.g., vanadium, iron and/or nickel, is treated with an antimony tris (hydrocarbyl sulfonate) to passivate the contaminant metal.

16 Claims, No Drawings

PASSIVATION OF METALS WHICH CONTAMINATE CRACKING CATALYSTS WITH ANTIMONY TRIS (HYDROCARBYL SULFONATE)

This invention relates to catalytic cracking of a hydrocarbon. In one of its aspects it relates to a method for passivating a contaminant metal on a hydrocarbon cracking catalyst, e.g., vanadium, iron, and/or nickel. In another of its aspects the invention relates to the catalyst composition comprising a passivating agent. Further, another aspect of the invention is in the provision of a hydrocarbon, e.g., a hydrocarbon oil, catalytic cracking process.

In one of its concepts the invention provides a method for passivating the metal contaminant, e.g., vanadium, iron, and/or nickel, whenever it is on a hydrocarbon cracking catalyst by adding to the catalyst an antimony tris (hydrocarbyl sulfonate). In another of its concepts the invention provides a hydrocarbon cracking catalyst composition comprising a cracking catalyst and an antimony tris (hydrocarbyl sulfonate). In a further concept of the invention it provides a hydrocarbon cracking process, e.g., a process for cracking a hydrocarbon oil in the presence of a cracking catalyst to which there has been added an antimony tris (hydrocarbyl sulfonate) in an amount effective to passivate a contaminant metal thereon.

Cracking catalysts, when used to crack oil that contains metals, e.g., vanadium, iron, and nickel, accumulate a deposit of these metals. This decreases the yield of gasoline and increases yields of hydrogen and coke.

The invention discloses a method to passivate said metals on the catalysts bearing them. According to the invention, the method involves the addition of an antimony tris (hydrocarbyl sulfonate) to the catalyst, e.g., to the metals-contaminated catalyst.

Metals-contaminated cracking catalyst that are passivated according to the invention are any that are active to crack hydrocarbons in the absence of added hydrogen. Included are catalysts or contact masses which are amorphous silica/alumina and compositions that contain zeolites—synthetic or natural.

Such cracking catalyst materials can be any of those cracking catalysts conventionally employed in the catalytic cracking of hydrocarbons boiling above 400° F. (204° C.) for the production of gasoline, motor fuel blending components and light distillates. These conventional cracking catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention. Examples of cracking catalysts into or onto which antimony can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ion capable of conversion to a hydrogen ion. The unused catalytic cracking material employed will generally be in particulate form having a particle size principally within the range of about 10 to about 200 microns.

If desired, the cracking catalyst can contain a combustion promoter such as platinum or chromium.

The unused catalytic cracking material as employed in the present invention contains essentially no nickel, vanadium or iron. Particularly and preferably, the nickel, vanadium and iron metals content of the unused catalytic cracking material which constitutes the major portion of the unused cracking catalyst of this invention is defined by the following limits:

nickel: 0 to 0.02 weight percent;
vanadium: 0 to 0.06 weight percent;
iron: 0 to 0.8 weight percent.

The weight percentages in this table relate to the total weight of the unused catalytic cracking material including the metals nickel, vanadium and iron, but excluding the added antimony modifying agents. The contents of these metals on the cracking catalyst can be determined by standard methods well known in the art, e.g., by atomic absorption spectroscopy or by X-ray fluorescence spectroscopy.

The catalytic cracking materials can vary in pore volume and surface area. Generally, however, the unused cracking catalyst will have a pore volume in the range of about 0.1 to about 1 ml/g. The surface area of this unused catalytic cracking material generally will be in the range of about 50 to about 500 $m^2/g$.

It is an object of this invention to provide a method for passivating a metal contaminant on a hydrocarbon cracking catalyst. It is another object of the invention to provide a cracking catalyst composition comprising a passivating agent effective to passivate contaminating metal whenever it is on the catalyst. A further object of the invention is to provide a process for cracking a hydrocarbon in the presence of a catalyst metal contaminant thereon being passivated by the presence in the composition of the catalyst of a passivating agent.

Other aspects, concepts, objects and the several advantages of the invention are apparent from a study of this disclosure and the appended claims.

According to the invention there is provided a method for passivating metal contaminant on a hydrocarbon cracking catalyst by adding to the catalyst an antimony tris (hydrocarbyl sulfonate).

Also according to the invention, there is provided a catalyst composition suitable for cracking a hydrocarbon, e.g., a hydrocarbon oil, comprising a passivating amount of antimony tris (hydrocarbyl sulfonate) effective to passivate metal contaminant, e.g., vanadium, iron, and/or nickel, whenever it is on the catalyst.

Further, according to the invention, there is provided a process for the cracking of a hydrocarbon, e.g., a hydrocarbon oil, in the presence of a cracking catalyst comprising a passivating amount of an antimony tris (hydrocarbyl sulfonate).

The addition of the passivating agent can be practiced upon a used or an unused catalyst or contact mass.

The quantity of antimony to use to modify or to passivate the metal, when it has been deposited on the catalyst, should add about 0.01 to 8 weight percent, preferably about 0.02 to 2 weight percent, of antimony to the catalyst. These concentrations are expressed as the element, and are based on the weight of catalyst prior to treatment.

A variety of methods can be used to apply the antimony tris (hydrocarbyl sulfonate) to the catalyst. It can be added as a finely divided solid and dispersed by rolling, shaking, stirring, etc. Or, it can be dissolved in a suitable solvent, aqueous or organic, and the resulting solution used to impregnate the cracking catalyst—followed by drying to remove the solvent. Or, they can be dissolved or suspended in the oil that is the feedstock to the cracking process where, by virtue of their negligible vapor pressure at reaction conditions, they are retained on the catalyst.

The antimony tris (hydrocarbyl sulfonate) that is effective in this invention is $(RSO_3)_3Sb$ where R contains preferably not more than 25 carbon atoms and can be an alkyl, cycloalkyl, or aryl radical, or a combination of these radicals such as aralkyl, alkaryl, and the like. Examples of suitable compounds are antimony tris (methane sulfonate), antimony tris (benzene sulfonate), antimony tris (p-toluene sulfonate), and antimony tris (dodecylbenzene sulfonate).

Feedstocks amenable to treatment by the cracking catalyst of this invention are, generally, oils having an initial boiling point above 204° C. This includes gas oils, fuel oils, topped crude, shale oil, and oils from coal and/or tar sands. However the oils are derived or obtained, the invention is applicable to passivate the metals on the catalyst when thereon. The cracking process may utilize a fixed catalyst bed or a fluidized catalyst—the latter is preferred.

Specific conditions in the cracking zone and the regeneration zone of a fluid catalytic cracker depend on the feedstock used, the condition of the catalyst, and the products sought. In general, conditions in the cracking zone include Temperature: 427°–649° C. (800°–1200° F.);
Contact time: 1–40 seconds;
Pressure: 10 kiloPascals to 21 megaPascals (0.1 to 205 atm.);
Catalyst:oil ratio: 3/1 to 30/1, by weight;

and conditions in the regenerator include

Temperature: 538°–816° C. (1000°–1500° F.)
Contact time: 2–40 minutes
Pressure: 10 kiloPascals to 21 megaPascals (0.1 to 205 atm.)
Air rate (at 16° C., 1 atm.): 100°–250 ft$^3$/lb coke, or 6.2–15.6 m$^3$/kg coke It is presumed that the feedstock to the catalytic cracker, as described above, will contain a significant concentration of vanadium, iron, and/or nickel whose presence will affect adversely the catalyst's selectivity.

Since these metals become concentrated in the least volatile fractions of the feedstocks, the invention is especially valuable for cracking the heavy oils; it is probably the most important application for the passivated catalyst of this invention. The quantity of added antimony required to passivate vanadium, iron, and nickel is related directly to their concentration in the feedstock. The following table relates the total concentration in the feedstock of these metals to the concentration of added antimony on the cracking catalyst to passivate effectively these adventitious metals.

| Total V, Fe, Ni in Feedstock, ppm | Antimony added to Catalyst, wt %* |
|---|---|
| 40–100 | 0.05–0.8 |
| 100–200 | 0.1–1 |
| 200–300 | 0.15–1.5 |
| 300–800 | 0.2–2 |

*Based on weight of catalyst prior to addition of antimony passivating agent. Quantities are expressed as the element.

This invention is illustrated by the following example.

EXAMPLE I

Preparation of antimony tris (p-toluene sulfonate). This compound was prepared by a double decomposition reaction between antimony trichloride and p-toluene sulfonic acid. A solution of 28.53 g (0.15 mole) of p-toluene sulfonic acid monohydrate in 150 cc of toluene was distilled until the water was removed. The anhydrous acid solution was then added dropwise to a solution of 11.4 g (0.05 moles) of antimony trichloride in about 50 cc of refluxing toluene. The solution became dark reddish brown, and the initially formed precipitate redissolved. Reflux continued for two hours, and the solution was then cooled. It contained 3.05 wt% antimony by calculation. Part of the solution was used to treat a catalyst for testing, as outlined below.

A commercial cracking catalyst that had been used in a commercial fluid catalytic cracker until it had attained equilibrium composition with respect to metals accumulation (catalyst was being removed from this process system at a constant rate) was used to demonstrate passivation with antimony. The catalyst, being a synthetic zeolite combined with amorphous silica/alumina (clay), was predominantly silica and alumina. Concentrations of other elements together with pertinent physical properties are shown in Table I.

Table I

| Surface area, m$^2$g$^{-1}$ | 74.3 |
|---|---|
| Pore volume, ml g$^{-1}$ | 0.29 |
| Composition, wt % | |
| Nickel | 0.38 |
| Vanadium | 0.60 |
| Iron | 0.90 |
| Cerium | 0.40 |
| Sodium | 0.39 |
| Carbon | 0.06 |

A portion of this used, metals-contaminated catalyst was treated with antimony as follows. A solution, prepared by diluting 5.74 g of antimony tris (p-toluene sulfonate) in toluene (see above) with 30 cc of toluene, was stirred into 35 g of the used catalyst. Solvent was removed by heating, with stirring on a hot plate at about 260° C. This treatment added 0.50 wt% antimony to the catalyst. The treated catalyst was then prepared for testing by aging it. The catalyst, in a quartz reactor, was fluidized with nitrogen while being heated to 482° C., then it was fluidized with hydrogen while the temperature was raised from 482° to 649° C. Maintaining that temperature, fluidization continued for 5 minutes with nitrogen, then for 15 minutes with air. The catalyst was then cooled to about 482° C., still being fluidized with air. The catalyst was then aged through 10 cycles, each cycle being conducted in the following manner. The catalyst at about 482° C., was fluidized with nitrogen for one minute, then heated to 510° C., during two minutes while fluidized with hydrogen, then maintained at 510° C., for one minute while fluidized with nitrogen, then heated to about 649° C., for 10 minutes while fluidized with air, and then cooled to about 482° C., during 0.5 minutes while fluidized with air. After 10 such cycles it was cooled to room temperature while being fluidized with nitrogen and was ready for testing.

The used and the antimony-treated catalysts were tested in a fixed bed reactor using Kansas City gas oil as feedstock to the cracking step. The cracking reaction was carried out at about 482° C., and atmospheric pressure for 0.5 minutes; regeneration was at about 593° C., and atmospheric pressure; the reactor was purged with nitrogen before and after each cracking step.

Properties of the Kansas City gas oil used in the cracking steps are summarized in Table II.

Table II

| | |
|---|---|
| API gravity at 15.6° C. | 30.2° |
| BMCI | 30.1 |
| Carbon residue, Ramsbottom | 0.23 wt % |
| Analysis for some elements | |
| Carbon | 88.3 wt % |
| Hydrogen | 11.8 wt % |
| Sulfur | 0.20 wt % |
| Oxygen | 0.075 wt % |
| Nitrogen | 0.08 wt % |
| Nickel | 0.25 ppm |
| Vanadium | 9. wt % |
| Molecular wt. (number average) | 328 |
| Distillation (by ASTM D 1160-61) | |
| 2% | 288° C. |
| 10 | 320 |
| 20 | 340 |
| 30 | 357 |
| 50 | 399 |
| 70 | 458 |
| 90 | 542 |
| Kinematic viscosity (by ASTM D 445-65) | |
| at 54.4° C. | 62.5 centistokes |
| at 98.9° C. | 39.3 centistokes |

Results of the tests on the two catalysts are summarized in Table III.

TABLE III

| Catalyst | Catalyst: oil weight ratio | Conversion vol % of feed | Yield | | |
|---|---|---|---|---|---|
| | | | Coke, wt % of Feed | SCF H₂/bbl feed converted | Gasoline vol % of feed |
| Used | 7.13 | 72.4 | 9.4 | 707 | 44.3 |
| Used + 0.50 wt % Sb | 7.1 | 71.3 | 8.5 | 560 | 50.6 |

This comparison of the two catalysts shows that, at essentially identical conditions, the addition of 0.50 wt% antimony as antimony tris (p-toluene sulfonate) decreased conversion by 1.5%, but it increased gasoline yield by 14%, decreased coke production by 10%, and decreased the yield of hydrogen by 21%.

U.S. Pat. No. 3,711,422, Marvin M. Johnson and Donald C. Tabler, Jan. 16, 1973, discloses and claims restoring the activity of a cracking catalyst with a compound of antimony, e.g., antimony triphenyl. U.S. Pat. Nos. 4,025,458, May 24, 1977 and 4,031,002, June 21, 1977, Dwight L. McKay, disclose and claim passivating metals on cracking catalysts with antimony compounds, e.g., a phosphorodithioate, as described in the patents.

Reasonable variation and modification are possible within the scope of the foregoing disclosure and the appended claims to the invention the essence of which is that an antimony tris (hydrocarbyl sulfonate) has been found to be effective to passivate contaminating metal on a hydrocarbon cracking catalyst, as described.

We claim:

1. A method for passivating a contaminating metal on a hydrocarbon cracking catalyst which comprises adding to said catalyst, an antimony tris (hydrocarbyl sulfonate).

2. A method according to claim 1 wherein the contaminant metal is at least one of vanadium, iron and nickel and the antimony compound is at least one selected from antimony tris (methane sulfonate), antimony tris (benzene sulfonate), antimony tris (p-toluene sulfonate), and antimony tris (dodecylbenzene sulfonate).

3. A method according to claim 1 wherein the catalyst is a hydrocarbon oil cracking catalyst, the contaminating metal is at least one of vanadium, iron and nickel and the hydrocarbon is a hydrocarbon oil.

4. A method according to claim 3 wherein the antimony compound is at least one of antimony tris (methane sulfonate), antimony tris (benzene sulfonate), antimony tris (p-toluene sulfonate), and antimony tris (dodecylbenzene sulfonate).

5. A method according to claim 1 wherein the catalyst is a hydrocarbon oil cracking catalyst containing at least one of amorphous silica/alumina and a zeolite, the contaminating metal is at least one of vanadium, iron and nickel and the hydrocarbon is a hydrocarbon oil and the catalyst has had added to it a passivating amount of antimony tris (p-toluene sulfonate).

6. A catalytic composition comprising a hydrocarbon cracking catalyst the activity of which is impaired by a contaminating metal selected from vanadium, iron and nickel and to which there has been added an antimony tris (hydrocarbonyl sulfonate).

7. A composition according to claim 6 wherein the antimony compound is at least one selected from antimony tris (methane sulfonate), antimony tris (benzene sulfonate), antimony tris (p-toluene sulfonate), and antimony tris (dodecylbenzene sulfonate).

8. A catalytic composition according to claim 6 wherein the antimony compound is antimony tris (p-toluene sulfonate).

9. A method according to claim 1 wherein the antimony compound is antimony tris(p-toluene sulfonate).

10. A method according to claim 1 wherein the catalyst has been used for cracking a hydrocarbon.

11. A method according to claim 1 wherein the catalyst is unused.

12. A method according to claim 1 wherein the antimony tris(hydrocarbyl sulfonate) is represented by the formula $(RSO_3)_3Sb$ where R contains not more than about 25 carbon atoms and is an alkyl, cycloalkyl, aryl, aralkyl or alkaryl radical.

13. An antimony tris(hydrocarbyl sulfonate).

14. A compound according to claim 13 wherein the antimony tris(hydrocarbyl sulfonate) can be represented by the formula $(RSO_3)_3Sb$ where R contains preferably not more than 25 carbon atoms and can be an alkyl, cycloalkyl, or aryl radical, or a combination of these radicals such as aralkyl or alkaryl.

15. A compound according to claim 14 wherein the compound is at least one selected from antimony tris (methane sulfonate), antimony tris (benzene sulfonate), antimony tris (p-toluene sulfonate), and the antimony tris (dodecylbenzene sulfonate).

16. Antimony tris (p-toluenesulfonate).

* * * * *